Aug. 22, 1961 G. ZIEHER 2,996,806
VERTICAL LENGTH MEASURING DEVICE
Filed Aug. 10, 1960 2 Sheets-Sheet 1

United States Patent Office 2,996,806
Patented Aug. 22, 1961

2,996,806
VERTICAL LENGTH MEASURING DEVICE
Gustav Zieher, Aalen, Wurttemberg, Germany, assignor to Carl Zeiss, Heidenheim (Brenz), Wurttemberg, Germany
Filed Aug. 10, 1960, Ser. No. 48,670
Claims priority, application Germany Aug. 17, 1959
5 Claims. (Cl. 33—143)

The invention relates to vertical length measuring devices. In devices of this type the workpiece engaging the lower end of a vertical measuring sleeve is first moved away from its zero position so that the workpiece to be measured can be placed underneath said measuring sleeve. Subsequently, the measuring sleeve is permitted to move lengthwise downwardly into contact with the workpiece by its own weight or is moved by a motor drive or the like. A measuring scale which is connected with the measuring sleeve is moved with the sleeve and can be observed by a reading microscope. After the measuring sleeve comes to rest, the measurement value can be read off the scale. During the measuring operation the measuring sleeve will engage the workpiece rather forcefully and rebounces rapidly before finally coming to rest. In order to overcome this disadvantage, one provided formerly a counterweight for reducing the force of the impact of the measuring sleeve with the workpiece. This counterweight was made slightly lower in weight than the measuring sleeve itself and was connected by a rope guided over a pulley with the measuring sleeve. This arrangement reduces the force of the impact, but the rebound movement of the sleeve remains the same. In order to eliminate this rebound movement of the sleeve, the same is provided with a damping device. This damping device consists in a weight having the form of a piston which slides in a cylinder filled with oil. When the measuring sleeve moves towards the workpiece, the piston moves a little farther than required, but this additional movement is damped by the oil, particularly the rebound movement of the piston, to such an extent that the rebound movement is not noticeable. While such a damping device is satisfactory, it has the disadvantage that the oil runs easily out of the cylinder, particularly at rapid movements of the piston. Difficulties are encountered when transporting the measuring device with this damping device attached thereto, due to the oil in the cylinder.

It is an object of the invention to overcome the disadvantages of the known devices in that a damping device is employed which is provided with a piston moving in an air filled cylinder while a spring is arranged parallel thereto. This has the effect that the air damping is reinforced to such an extent by the action of the spring, due to the larger relative movement, that a rebound movement of the measuring sleeve does not occur. On the other hand the air damping prevents an oscillation of the counterweight, because the weight is now suspended by a spring. The spring suspension and the air damping supplement each other to produce an effective total damping.

Preferably, the weight is attached to the lower end of the spring, and the piston to the upper end of the same. The advantage of this arrangement is that the spring will pull the piston into its initial position after each measuring operation. Preferably, the weight is constructed as a cylinder so that the spring is guided by the cylinder.

If the damping is to be increased, an additional spring may be connected in the described device. Such an additional spring is preferably arranged between the weight and the damping means, but in such a case minor oscillations of the weight may occur.

The damping device of the invention is primarily intended for damping the rebound movement of the measuring sleeve. If it is desirable to damp also the downward movement of the sleeve, a further air damping device may be arranged between the described damping means and the measuring sleeve.

An embodiment of the present invention is shown in the accompanying drawings, wherein.

Figure 1:
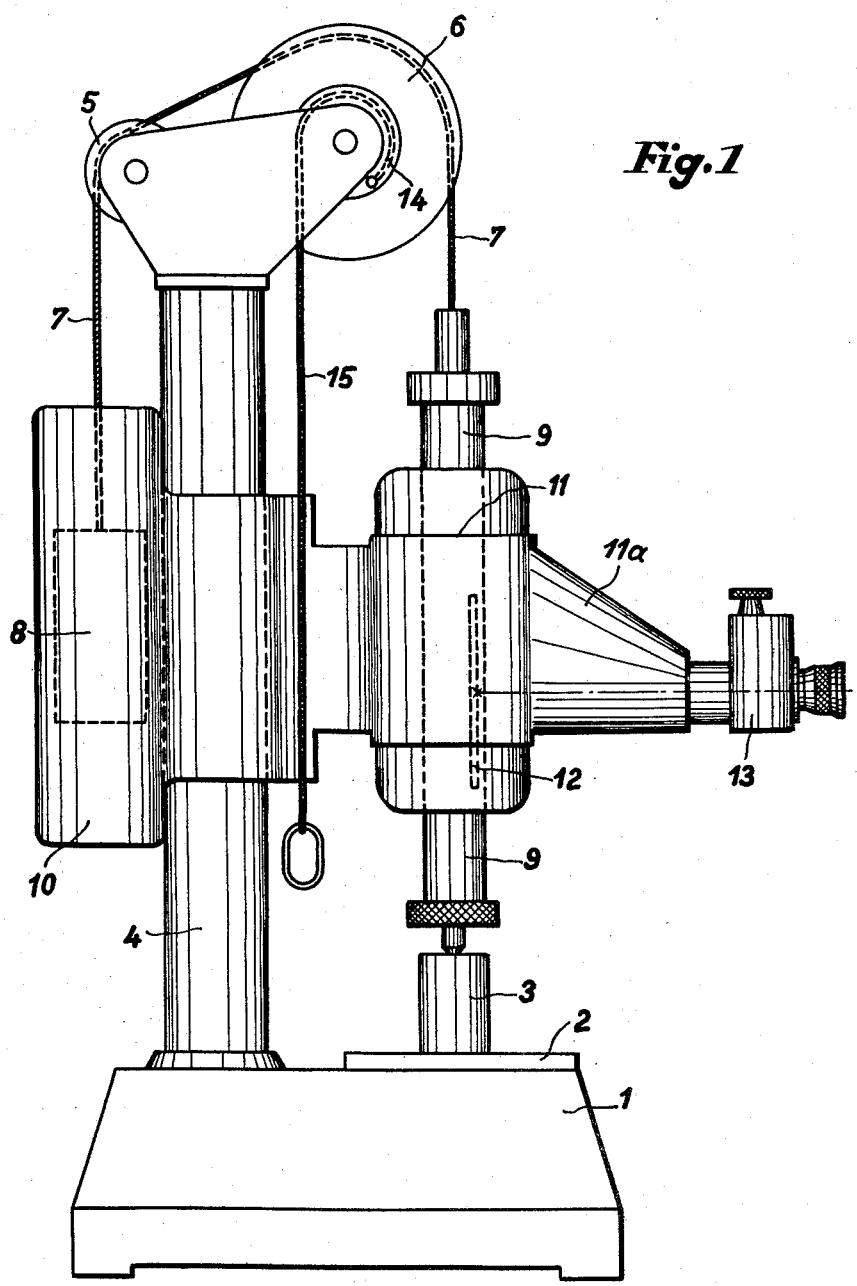
FIG. 1 shows an elevation view of the length measuring device.
Figure 2:
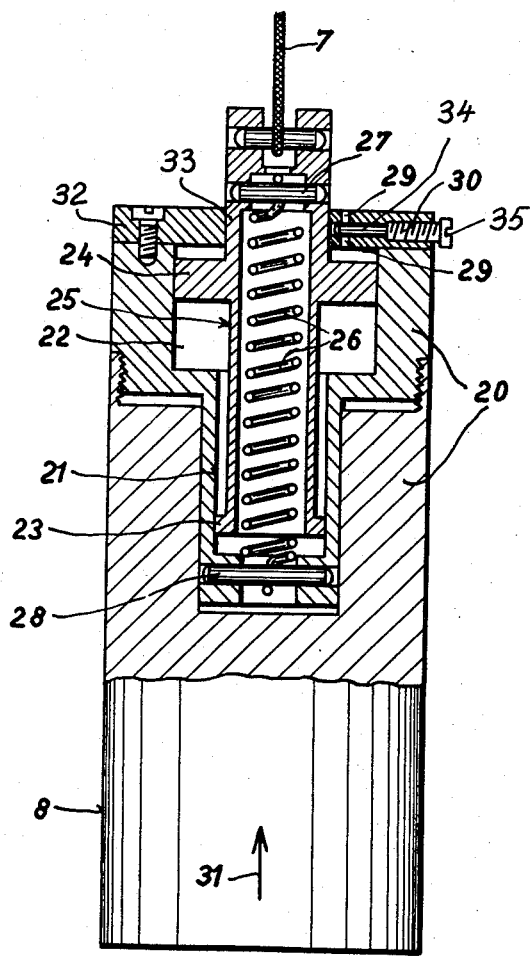
FIG. 2 shows a sectional view of the damping device.

Referring to FIG. 1, a base 1 has mounted thereon a table plate 2 upon which the workpiece to be measured is placed. A column 4 extending upwardly from the base 1 has mounted at its upper end two sheaves 5 and 6 for guiding a rope 7 one end of which has a weight 8 attached thereto while the other end is attached to the upper end of a measuring sleeve 9. The weight 8 is vertically guided in a housing 10 and the measuring sleeve 9 is vertically guided in a housing 11. A scale 12 is arranged on the measuring sleeve 9 and the values of said scale can be read by a microscope 13 mounted on a lateral extension 11a of the housing 11. A circular disc 14 is attached concentrically to the sheave 6 and a rope 15 is placed around said disc 14. When the rope 15 is pulled, the sheave 6 will be rotated anti-clockwise in such a manner that the measuring sleeve 9 is raised, and in the raised position of the measuring sleeve 9 the workpiece 3 can be exchanged. Subsequently, the rope 15 is released so that the measuring sleeve 9 will descend and engage the upper end of the workpiece 3. In order to prevent a rebound of the measuring sleeve, the weight 8 is constructed as a damping device, as shown in FIG. 2. The weight 8 consists of a body 20 provided with axially arranged cylindrical recesses 21 and 22. These recesses 21 and 22 receive movably the axially spaced cylindrical portions 23 and 24 provided on a piston 25. The piston 25 is hollow and encloses a helical spring 26. The spring 26 is fastened to the upper end of the piston by a cross pin 27, and outside the lower end of the piston the spring 26 is directly attached to the body 20 by a cross pin 28. The upper end of the recess 22 is covered by a plate 32 through which a reduced upper portion 33 of the piston 25 extends slidably. A transverse bore 29 in the plate 32 is controlled by a radial needle valve 34 the threaded shaft 30 of which engages a threaded bore in the plate 32. A slotted head 35 on the shaft 30 permits a ready adjustment of the needle valve 34.

The operation of the device is as follows:

When the measuring sleeeve 9 moves downwardly, the weight 8 moves upwardly in the direction of the arrow 31. When the measuring sleeve 9 comes to rest upon the workpiece 3 to be measured, the weight 8 will move a small amount farther upwardly. Subsequently, the weight 8 will descend again due to the gravity. This movement of the weight in downward direction will be resisted by the spring 26 and also by the excessive pressure of the air in the chamber formed above the cylindrical portion 24 of the piston 25 in the cylindrical recess 22 so that the weight 8 will slowly move downwardly and no jolts will be exerted upon the rope 7 so that the measuring sleeve 9 will not again be lifted from the workpiece 3. The magnitude of damping the downward movement of the weight 8 can be controlled by adjusting the needle valve 34 which controls the bore 29.

If also the downward movement of the measuring sleeve 9 is to be damped, a further air damping means may suitably be provided between the weight 8 and the measuring sleeve 9. If the downward movement of the measuring sleeve is effected by a motor, the additional air damping device can be omitted when the drive is constructed with a slip or pawl arrangement.

What I claim is:

1. In a vertical length measuring device, a base provided with an upwardly extending column, sheave means on said column, a rope passing over said sheave means with both ends of said rope extending downwardly, a measuring sleeve attached to one end of said rope, a counterweight attached to the other end of said rope, a table means on said base and positioned below said measuring sleeve and upon which the workpiece to be measured is placed, and damping means for braking the movement of said counterweight, said damping means including a cylinder filled with air, a piston slidably mounted in said cylinder, and a helical spring arranged parallel to said piston.

2. In a vertical length measuring device, a base provided with an upwardly extending column, sheave means on said column, a rope passing over said sheave means with both ends of said rope extending downwardly, a measuring sleeve attached to one end of said rope, a counterweight attached to the other end of said rope, a table means on said base and positioned below said measuring sleeve and upon which the workpiece to be measured is placed, and damping means for braking the movement of said counterweight, said damping means including a cylinder filled with air, a piston slidably mounted in said cylinder, a helical spring arranged parallel to said piston, means for attaching said counterweight to the lower end of said spring, and means for attaching said piston to the upper end of said spring.

3. A vertical length measuring device according to claim 2, in which said cylinder is formed integrally with said counterweight and that said piston is provided with an axial bore within which said helical spring is arranged.

4. A vertical length measuring device according to claim 1, including an additional spring arranged between said weight and said damping means.

5. A vertical length measuring device according to claim 1, including another damping means arranged between said first mentioned damping means and said measuring sleeve.

No references cited.